(12) United States Patent
Hovey et al.

(10) Patent No.: US 10,723,454 B1
(45) Date of Patent: Jul. 28, 2020

(54) AERIAL SHOW SYSTEM USING UNMANNED AERIAL VEHICLE (UAV) ENERGY TO ANIMATE CREATIVE SHOW ELEMENT

(71) Applicant: DISNEY ENTERPRISES, INC., Burbank, CA (US)

(72) Inventors: Pehr L Hovey, Highland Park, CA (US); Madeline R Zupan, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/536,401

(22) Filed: Aug. 9, 2019

(51) Int. Cl.
*G09F 21/12* (2006.01)
*B64C 39/02* (2006.01)
*B64D 1/18* (2006.01)
*A63J 99/00* (2009.01)
*B64D 5/00* (2006.01)
*A63G 33/00* (2006.01)

(52) U.S. Cl.
CPC ............. *B64C 39/024* (2013.01); *A63J 99/00* (2013.01); *B64D 1/18* (2013.01); *B64D 5/00* (2013.01); *B64C 2201/027* (2013.01)

(58) Field of Classification Search
CPC . G09F 21/00; G09F 21/12; B64B 1/00; B64B 1/58; A63G 31/00; A63G 31/14; A63G 33/00; B64C 39/024; G01J 1/0266; G01J 1/0295

USPC .......... 40/212, 215, 427, 439, 442; 472/130, 472/137, 59-60
See application file for complete search history.

(56) References Cited

U.S. PATENT DOCUMENTS

| 286,718 | A | * | 10/1883 | Linton | |
| 2,153,940 | A | * | 4/1939 | Shorb | G09F 21/12 40/215 |
| 10,424,231 | B2 | * | 9/2019 | Salem | G09F 21/12 |
| 2015/0336015 | A1 | * | 11/2015 | Blum | A63G 33/00 472/137 |

* cited by examiner

*Primary Examiner* — Kien T Nguyen
(74) *Attorney, Agent, or Firm* — Snell & Wilmer LLP; Kent A. Lembke (57) ABSTRACT

An aerial show system for leveraging downwash and other forces to use an unmanned aerial vehicle (UAV) as a creative element in a show. UAVs in the aerial show system each include a propulsion and lift mechanism, which generates downwash as it moves the UAV about a show's airspace. The aerial show system also includes one-to-many show effect devices adapted to make use of the downwash to activate or animate one or more movable components to generate a desired show effect, e.g., a spinning propeller or fan on an object carried or tethered beneath the UAV chassis/body. The movable component would otherwise be static or passive and relies on the potential and/or kinetic energy created by the UAV in airspace for actuation or animation.

26 Claims, 5 Drawing Sheets

AERIAL SHOW SYSTEM USING UNMANNED AERIAL VEHICLE (UAV) ENERGY TO ANIMATE CREATIVE SHOW ELEMENT

BACKGROUND

1. Field of the Description

The present description relates, in general, to aerial shows or displays, and, more particularly, the description relates to a new aerial show system (and related operational method) adapted for utilizing energy of an unmanned aerial vehicle (UAV) to activate and/or animate creative show effect devices or show elements to produce dynamic show effects as the UAV flies through a show's airspace.

2. Relevant Background

There is a strong demand for new ways to provide shows or displays in the sky. These shows and displays may be provided, for example, to crowds of people visiting a theme or amusement park or enjoying their time on a cruise ship. In other cases, an airborne display or show is provided to sports fans before or after a sporting event or even at halftime or another break.

Many of these sky-based or airborne shows or displays have relied wholly on show systems positioned on the ground. For example, a fireworks or other pyrotechnic show may involve launching show components in a choreographed manner with, in some cases, synchronization with a soundtrack (e.g., operation of a ground-based sound system). As another example, a show or display may involve a light and/or laser show that illuminates the overhead sky and/or screens and/or other objects on the ground or in the sky above the viewers. In other cases, the shows or displays have used fountains to project water in a dynamic manner, which can be choreographed and synchronized with a soundtrack, and lighting often is used to illuminate the projected water.

More recently, show and display designers have begun to attempt to use unmanned aerial vehicles (UAVs) or drones, such as quadcopters, but the results have not met all of the goals or needs of the show and display designers. Particularly, to date, the UAVs generally have simply been controlled through execution of a pre-programmed set of movements (e.g., to carry out a predefined flight plan) over a space. Some of these UAVs have been used to carry themed payloads or to lift static show elements such as a projection screen off the ground. Larger UAVs have stronger downwash forces due to their powerful rotors that cause undesired movement of the payload due to turbulent air, and the show designers typically have addressed this problem by choosing more rigid show elements or more permeable materials to limit the effects of the downwash.

SUMMARY

The inventors recognized a need to provide a way to handle the large forces provided by the downwash from UAV rotors (or propulsion and lift mechanisms). Also, the inventors understood that launching show effect devices (or "show elements") for mid-air maneuvers typically required a ground-based winch and tower system. Also, dropping or dispersing show elements, such as artificial snow or confetti, over a large area had required large amounts of infrastructure such as towers in or near a show airspace.

With these and other issues in mind, an aerial show system was created that employs a number of methods of leveraging downwash and other forces, such as kinetic movement or energy and potential energy, produced or provided by a UAV as a creative element in its own right. UAVs in the aerial show system each include a propulsion and lift mechanism, which may include one or more rotors or propellers, and the propulsion and lift mechanism generates downwash as it moves the UAV chassis/body in three dimensions about a show's airspace. The aerial show system also includes one-to-many show effect devices or show elements that are adapted to make use of the downwash (e.g., its kinetic energy or turbulent airflow) to activate or animate one or more movable components (or features that are configured for animation in response to being placed in the downwash from the UAV) to generate a desired show effect (e.g., a spinning propeller or fan on an object carried or tethered beneath the UAV chassis/body).

Typically, the movable component would otherwise be passive (e.g., is not internally actuated by an integrated motor or the like) and relies on the energy or forces output by or created by the UAV for actuation or animation. In other cases, the UAV's kinetic energy or movement of its chassis/body is used to activate a show effect device or show element, such as to provide energy to a ground-based show element to create a mid-air pendulum or launch without need of a tower. In some cases, the potential energy or the lift provided by the UAV is used to impart animation to show elements such as by dropping the element, and this may be furthered by energy from the downwash, which may be enhanced by use of a funnel or other device to target the downwash energy or flow through or near the dropped show elements (e.g., artificial snow, water streams or droplets, confetti, promotional items, or the like).

More particularly, a system is provided that is adapted for providing an aerial show with animated show elements. The system includes an unmanned aerial vehicle (UAV) with a chassis and lift and propulsion mechanisms moving the chassis to one or more heights above the ground. The system also includes a show effect device including an actuatable component, which typically is passive (or not self-actuated for any movement). During operations, the show effect device is coupled to the chassis to move with the UAV through the airspace, and the actuatable component is actuated by conversion of kinetic or potential energy imparted to the show effect device by the moving of the chassis of the UAV in the airspace.

In some embodiments, the kinetic energy results from the UAV moving in three dimensions in the airspace, and the potential energy results from the UAV moving to any height above the ground. The flight propulsion mechanisms generate downwash during the operation of the UAV in the airspace, and the actuatable component may be aerodynamically coupled to the downwash so that it is fully (without need for the kinetic or potential energy imparted by the UAV) or further actuated by the downwash. The actuatable component may be static until contacted by the downwash and may include aerodynamic surfaces that convert the downwash into motive force to actuate moving elements of the show effects device.

In some embodiments, the show effect device is supported by the chassis, the actuatable component includes a plurality of particles released from show effect device, and the downwash induces movement of the plurality of particles to achieve a show effect. In such embodiments, the show effect device may further include a funneling element receiving and redirecting the downwash to direct a trajectory of the plurality of particles released from the show effect device. In these or other implementations, the particles may be water droplets, and the downwash spreads the water droplets to form a projection surface, with the system further including a projector projecting video or light (e.g., laser light) onto the projection surface.

In some cases, the show effect device is physically attached to the chassis, is suspended from the chassis, or is towed by the UAV during the moving through the airspace. The lift and propulsion mechanisms may generate turbulence in the air of the airspace, and aerodynamic surfaces of the actuatable component convert energy provided by the turbulence in the air into an animation motive force. The show effect device can be positioned on the ground, and the UAV can be controlled to traverse above the actuatable component to direct downwash from the lift and propulsion mechanisms onto surfaces of the actuatable component to actuate movement of the actuatable component. The show effect device can instead be coupled to the chassis, and the actuatable may include an object operable to perform acrobatic maneuvers after release in the airspace from the show effect device. In such implementations, the moving of the UAV (kinetic energy) and/or the height of the UAV in the airspace (potential energy) upon the release provides launching conditions for completion of the acrobatic maneuvers. In some useful cases, the show effect device is positioned on the ground, and the actuatable component is tethered to the chassis and is adapted to use the kinetic energy to obtain lift, launch, or pendulum movement in the airspace.

DETAILED DESCRIPTION

Briefly, a system is described herein that is particularly well-suited for providing a show or display in the sky or space above or near a group of viewers or observers below (e.g., on the ground). The show includes one or more show effects provided by a show element or show effect device that makes use of energy provided by or output by one or more unmanned aerial vehicles (UAVs) to generate a show effect. The "energy" may be potential energy provided by the UAV to the show effect device as it lifts it to some height above the ground or be kinetic energy provided by the UAV's movement in three dimensions in the show airspace above the ground. In some preferred embodiments, the "energy" is the force in the downwash (or "downwash force") produced by the lift and propulsion mechanisms (e.g., rotors, propellers, or the like) of the UAV, and the show effect device includes one or more movable or actuatable components that may be static until exposed to the downwash from the UAV at which point they are actuated or animated to move and provide a show effect (e.g., to cause thematic elements of a set piece such as a robot to rotate or otherwise move, improving the verisimilitude of the appearance).

The aerial vehicle may take the form of nearly any UAV or drone configured for lifting and/or carrying heavier loads while other embodiments may use other aircraft such that "UAV" (or "drone") is intended to be construed in a very broad sense. In many cases, the UAV will be configured such as with a chassis or body upon which a show effect device may be mounted or a show effect device may be tethered/coupled to the chassis or body to be supported below or behind the UAV. It is anticipated by the inventors as the size and payload lifting capabilities of UAVs increase due to technological advances, they will similarly generate stronger downwash force that can be effectively exploited to create new and exciting show effects as part of an aerial show or display.

Figure 1:
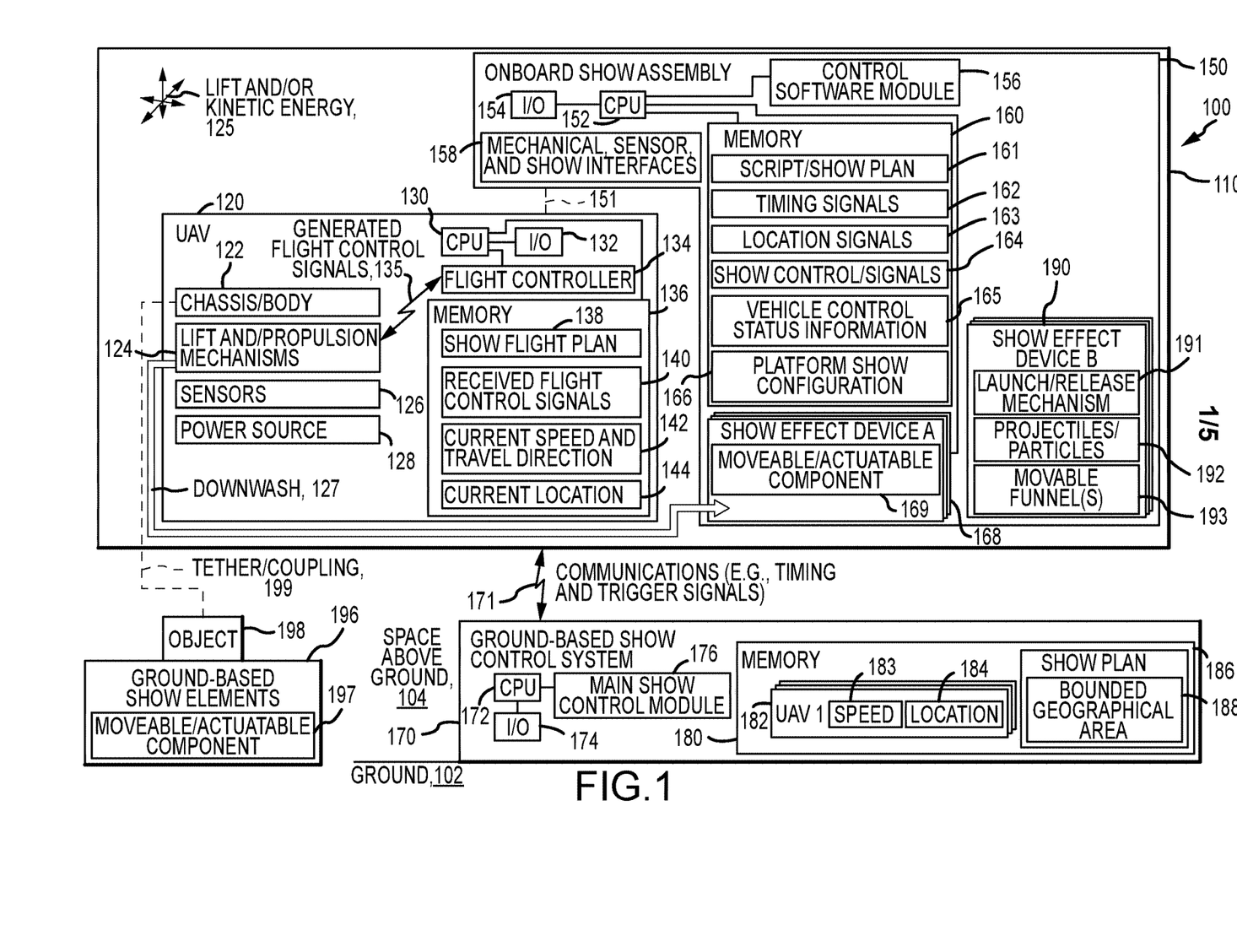
FIG. 1 illustrates a functional block diagram of an aerial show system using energy of a UAV to create show effects according to the present description.

FIG. 1 illustrates a functional block diagram of an aerial show or display system 100 that makes use of energy provided by or created by a UAV 120 using techniques of the present description. The system 100 includes a UAV (or drone) 120 and an onboard show assembly 150. The UAV 120 is configured to support the onboard show assembly 150, as shown with dashed line 151, and to move it about in a space 104 above the ground 102 in three dimensions as shown with arrows 125. The UAV (or UAVs) 120 may take many forms to implement the system 100. In general, the UAV 120 may be any unmanned aerial vehicle or object including vehicles movable or propellable through the space 104, via lift and propulsion mechanisms 124, such as vehicles using propellers such as plane-type drones and such as helicopter-type vehicles using 1-to-6 or more propellers or rotors such as tricopters, quadcopters, and aerial vehicles, and propulsion and lift for movement 125 of the chassis/body 122 (and supported show assembly 150) is provided by flight propulsion mechanisms (e.g., motor and propeller combinations) 124.

The UAV 120 often will be chosen for its ability to support its own weight while also supporting weight (and drag during flight) of the onboard show assembly 150. The UAV 120 further includes a power source 128 (such as a battery or batteries) to power operations of the mechanisms 124 and other power-requiring components of the UAV 120. Sensors 126 are provided to sense operations of the UAV 120 including the propulsion mechanisms 124 and for determining operating parameters such as roll, pitch, and yaw of chassis/body 122, speed (and direction in some cases) of chassis/body 122, and location/position of the chassis/body 122 in the space 104. The arrows 125 are also used to show that the UAV 120 provides potential energy to the show assembly 150 by lifting it to some height above the ground 102 and provides kinetic energy to the show assembly 150 (and any coupled/tethered 199 offboard object 198) through its movements through the airspace 104. Further, as shown with arrows 127, the lift and propulsion mechanism 124 generate downwash during their operations, and, as discussed below, the show assembly 150 and/or ground-based show elements 196 may be configured to make use of the downwash forces (or air turbulence) to create unique show effects with their actuatable or movable components 169 and 197, respectively.

The UAV 120 also includes a processor(s) 130 that manages communications (typically wireless) with a ground-based show control system 170 as shown with arrows 171. Input/output (I/O) devices 132 are provided for this purpose and may include wireless transceivers and the like as is well known in the UAV industry. The UAV 120 includes memory/data storage 136 that is managed by the processor 130, and a flight controller 134 (e.g., hardware and software) also managed (or code executed) by the processor 130. The flight controller 134 processes and executes a flight plan 138 stored in memory for a particular show/display performed during operation of the system 100, and configuration and/or setting files may be provided in the plan 138 or separately in memory 136 that are per platform 110 and per show/display (e.g., configuration and/or settings to determine how the flight controller 134 and/or onboard show controller 156 (such as with data 166) reacts dynamically to the show environment).

In response, the flight controller 134 may generate flight control signals 135 that are provided or communicated to the flight propulsion mechanisms 124 to cause these to operate to move 125 the UAV 110 from one location to the next along the flight path at a desired speed. The signals 135 may also be generated based on output from the sensors 126 such as based on current travel speed, direction, and 3D orientation 142 and/or current position/location 144 in the space 104 relative to desired show marks/positions and timing defined in the show flight plan 138. Further or alternatively, the signals 135 may be generated by the flight controller 134 based on received flight control signals 140 from the ground-based show control system 170 as shown with communications 171 and/or based on input from the onboard show assembly 150 and its control software module/show controller 156.

The UAV 120 includes a chassis 122 housing or supporting flight propulsion mechanisms 124 capable of lift and/or movement in three dimensions as shown with arrows 125. The flight controller 134 is provided on the UAV 120 to generate and/or receive flight control signals 135 and 140, and the controller 134 is coupled to the flight propulsion mechanisms 124. The mechanisms 124 and/or sensor 126 operate to indicate an absolute or relative position 144 in the space 104, and the flight controller 134 causes the lift and propulsion mechanisms 124 to move 125 the UAV chassis 122 to locations indicated by the flight control signals 135 (and signals 140), with the locations often being defined in the show flight plan 138.

An onboard show assembly 150 is supported by the UAV 120 (as shown with dashed line 151) to move 125 with the UAV 120, which imparts potential and kinetic energy 125 to the assembly 150 and its components including show effect device 168. The show assembly 150 includes a processor 152 managing operations of I/O devices 154 to facilitate communications with offboard devices such as communications 171 with the ground-based show control system 170. The processor 152 also executes code/instructions or runs software in local memory 160 to provide the functionality of an onboard show controller or control software module 156.

Particularly, the show controller 156 acts to process a script(s) or show plan 161 to generate a set of show control signals 164, which are communicated to one or more show effect devices 190 to cause their launch/release mechanisms 191 to operate to release or launch projectiles or particles 192 (such as confetti, artificial snow, water streams/particles, and so on) to create a particular show effect making use of the lift and/or kinetic energy 125 and/or the downwash 127 from lift and propulsion mechanisms 124. The assembly 150 includes interfaces 158 to the mechanisms 124, to the sensors 126, and/or the flight controller 134 to allow it to receive vehicle control status information 165 (e.g., flight speed, chassis orientation (yaw, pitch, and roll), and the like), current speed and travel direction 142, and current location 144 for the UAV 120. The show controller 156 may generate, from the script/show plan 161 or receive from the flight controller 134 or ground-based show control system 170, timing/trigger signals 162 and location signals 163, which may be used independently or in combination to create the show control signals 164.

The show plan 161 may include two or more scripts (or branches to new show segments) that may be chosen dynamically by the show controller 156 based on the timing signals 162, the location signals 163, and/or the vehicle control status information 165. In this manner, the show effect devices 190 may be operated to provide a desired show effect at predefined or dynamically selected timing and/or locations in the space 104 of the UAV 110. The show controller 156 can also generate the alternative scripts for one or more of the show effect devices in real time. The predefined scripts/branches of the show or real time-generated scripts/branches of the show (e.g., to alternative in real time) may be selected or created by the show controller 156 based on real time data such as the current location 144 of the UAV, the current speed and travel direction 142, and/or the current orientation of the UAV chassis 122 (and, therefore, of the show effect devices 168, 190) as may be provided in the vehicle control status information 165 from sensors 126. The memory 160 may also store a show configuration 166 that configures via the module 156 operations of the platform 110 or how the platform 110 will process and react to all the signals.

All or a subset of the show effect devices 168, 190 may be provided on the UAV chassis 122 or may be otherwise coupled/tethered as shown with dashed lines 151 such as to be positioned below the UAV 120 as it moves 125 through the space 104. The show effect devices 168 each includes one or more movable or actuatable component 169 that uses the downwash (e.g., turbulent air or air flow) or downwash forces 127 to move or be animated (e.g., to flap such as a pivotal wing or tail, to rotate about a rotation axis such as propeller, a paddlewheel, or the like, and so on). To this end, the show effect device 168 is supported 151 so that the movable component 169 is exposed to a desired amount of the downwash 127 from a desired direction (and/or contacting a desired surface of the component 169).

The show effect device 190 may include a launch and/or release mechanism 191 that is responsive to receipt of the show control signals 164 to operate in one or more predefined manners. In this regard, the show effect device 190 includes one-to-many projectiles or particles 192, and the launch or release mechanism 191 may be triggered by the show control signals 164 to open a gate or door in a receptacle containing the particles 192 to cause them to be released and be activated or energized by the potential energy and/or kinetic energy 125 provided by the UAV 120. Further, a funnel 193 may be provided in device 190 that can be used to direct and/or concentrate the downwash 127 to cause it to impart its energy upon all or a portion of the released particles 192. The funnel 193 may also be used to direct the downwash 127 onto offboard objects such as movable and/or actuatable components 197 on ground-based show elements 196 in the system 100. The show effect devices 168, 190 and ground-based show elements 196 may take a wide variety of forms to implement the system 100 and may include, in some case, a lighting system (e.g., one-to-many white or colored LEDs, lasers, blacklights, and so on) to direct light upon movable or actuatable components 169, 197 or released and energized particles 192 (which may be particles or droplets of water or other materials distributed to form a projection screen/surface in the space 104), a sound system with a playback device and one or more speakers, a pyrotechnic system for creating one or more pyrotechnic effects, and/or a projectile system (e.g., for releasing or ejecting projectiles such as confetti, streamers, water droplets or streams, coupons, souvenirs, and other objects).

The onboard show system or assembly 150 includes computational resources such as processor(s) 152 and controller 156 that communicate with each other such as through the interfaces 158. The onboard show controller 156 with processor 152 (and with memory 160 in some cases) may be located wholly in or on the UAV chassis/body 122, and it may receive power from the power source 128 and data from the flight controller 134 (or directly from propulsion mechanisms 124 and/or sensors 126) from the host UAV chassis 122 via the interfaces 158 (e.g., through a show interface). The onboard show controller 156 may be connected to various onboard show effect devices 190 in order to directly control and sequence their operation.

In some embodiments of the platform 110, the onboard show controller 156 receives timing and trigger signals 171 from a ground-based show control system 170. To this end, the show control system 170 includes I/O devices 174 for communicating with I/O devices 154 of the onboard show assembly 150. The I/O devices 174 may be managed by a processor 172, which also executes code and/or runs software to provide functions of a main/central show control module or show controller 176. The show control system 170 further includes memory/data storage 180 storing for each UAV 120 in a show system fleet a record or file 182 that stores data particular to that UAV 120 and its show effect device 168 190 such as its current speed 183 and location/position 184 in the space as well as other operating data (e.g., orientation, operating status of its show effect devices 168, 190, and so on). The memory 180 may also store a show plan 186 defining flight paths and show scripts for each UAV 120 and its show assembly 150 and include definitions of bounded geographical areas 188 (e.g., definitions of boundaries of a show space within space 104 and/or go and no-go spaces above the ground 102 for one or more of the UAVs 120). The memory 180 may also store a log of how the actual show performance differed from the pre-defined plan in order to inform and improved the development of the control systems and content authoring.

During operations of the system 100, the onboard show controller 156 may receive timing and trigger signals 171 (and as shown stored in onboard memory 162) from the ground-based show control system 170. This system 170 operates independently of the safety-critical flight controller 134 of the UAV 120 but in coordination with the real-time location 144 (and signals 163) of the UAV chassis 122. The geographic location 144 (and location signals 163) can be used to actuate show effects by operation of the show effect devices 190 with control signals 164 based on pre-programmed conditions (e.g., entering and/or exiting a specific geographic area 188) in order to synchronize with the UAV's flight path in real time. Determination by the ground-based show control system 170 or the onboard show controller 156 that the UAV 120 is exiting a bounded geographical area 188 (e.g., due to factors such as navigational imprecision) may cause the onboard show controller 156 to generate show control signals 164 to suppress or modify operations of one or more show effect devices 190 so as to preserve the overall show appearance (e.g., to turn off or dim a lighting system or to halt operation of a pyrotechnic or projector system when a UAV 120 exits a show space in space 104).

Figure 2:
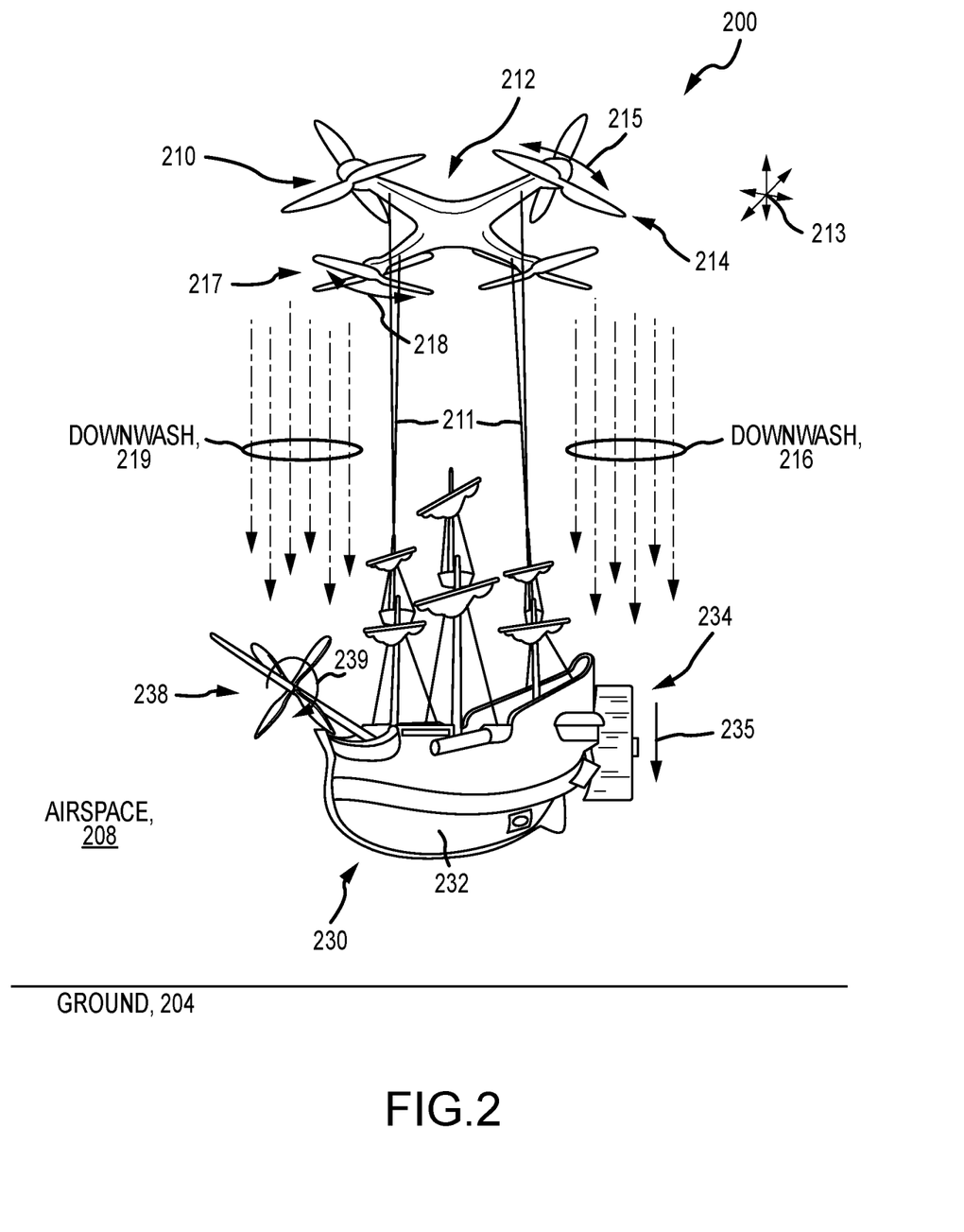
FIG. 2 a lower side perspective view of one exemplary implementation of an aerial show system of the present description showing use of downwash to animate a towed show effect device.

FIG. 2 a lower side perspective view of one exemplary implementation of an aerial show system 200 of the present description showing use of downwash 216, 219 to animate a towed show effect device 230. The system 200 is a portion of a typical system 100 of FIG. 1, with the other components of system 100 not shown for ease of explanation. As shown, the system 200 includes a UAV 210 with a chassis/body 212 and rotors 214, 217 (plus two additional rotors not referenced that together are part of the UAV's lift and propulsion mechanism(s)) that rotate/spin 215, 218 to provide lift and propulsion 213 in an airspace 208 above the ground 204.

The system 200 further includes a show effect device 230 with a body 232, which can take a wide variety of forms with FIG. 2 providing the example of a magical flying ship. The show effect device 230 includes a first movable or actuatable component 234 toward the rear of the body 232, e.g., a wheel or rear propeller that can spin about its center axis, and further includes a second movable or actuatable component 238 toward the front of the body 232, e.g., a front propeller or fan that can spin about its center axis. The show effect device 230 has its body coupled to the UAV chassis/body 212 via a set of wires/cables or other tethering members 211 such that the show effect device 230 hangs below the UAV 210 when the UAV 210 flies in the space 208 a distance above the ground 208. This movement (lift and three dimensional movement in space 208), hence, imparts potential energy and kinetic energy, respectively, to the body 232 of the show effect device.

Further, the show effect device 230 is adapted to make use of the rotation 215, 218 of the rotors 214, 217 to achieve a show effect(s). Particularly, the coupling with members 211 is designed to position the first actuatable component 234 in the path of the downwash 216 from the rotor 214 such that during operations of the system 200 the rotation 215 creates the downwash 216 which flows over the surfaces of the spinnable wheel 234 forcing it to spin 235. Stated differently, the downwash forces in flowing air 216 is used to perform work to animate the show effect device 230. Likewise, the second actuatable component 238 is positioned in the path of the downwash 219 created by the rotor 217 as it spins 218 to move 213 the UAV 210, and the downwash 219 contacts surfaces of the component 238 (e.g., its fan or propeller blades) forcing it to spin 239 (or to be actuated or animated). While two components 234, 238 are shown, the show effect device 230 could include only one such component or three, four, or more. The other components could take similar forms or differing forms and configurations to provide one or more surfaces upon which downwash force can be applied and to provide one or more features or elements that move in response to such application of force(s).

Figure 3:
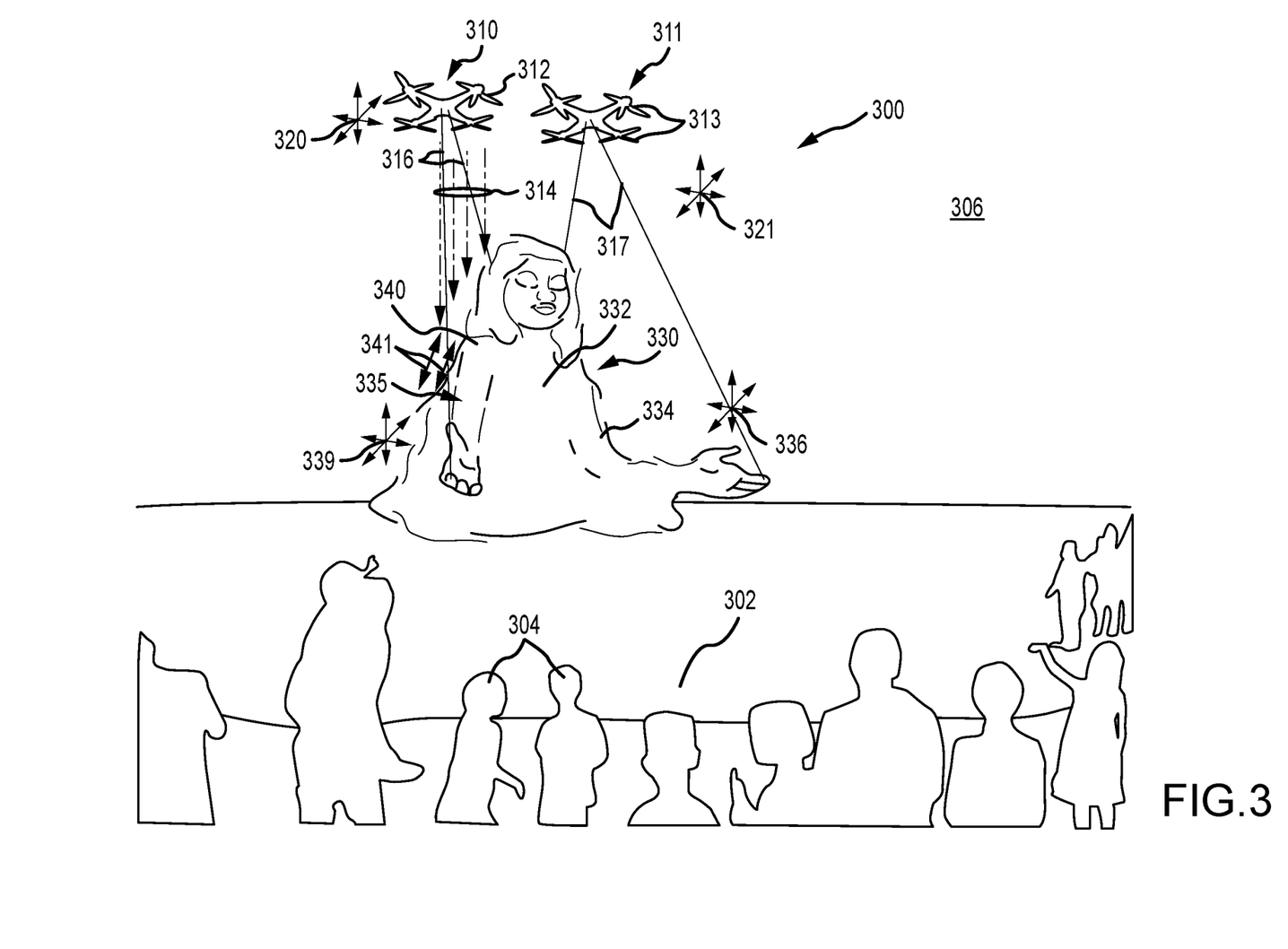
FIG. 3 illustrates another aerial show system (e.g., implementation of portions of the system of FIG. 1) of the present description using UAVs to animate or activate a show effect device using a combination of kinetic and potential energy along with downwash forces.

FIG. 3 illustrates another aerial show system (e.g., implementation of portions of the system of FIG. 1) 300 using UAVs 310, 311 to animate or activate a show effect device 330 using a combination of kinetic and potential energy along with downwash forces. In the system 300, a pair of UAVs 310, 311 are tethered to the show effect device 330 via cables/lines 316, 317, and the rotors 312, 313 of the UAVs 310, 311 are rapidly rotated to provide lift and propulsion (or 3D movement) 320, 321 through the airspace 306 above the ground 302 upon which audience members 304 are located.

The upward movement 320, 321 of the UAVs 310, 311, thus, provides lift to the body of the show effect device 330 to position it for display in the airspace 306, and the lifting above the ground 302 also imparts potential energy into the device 330 that can later be used to activate or animate one or more of its features as shown with arrow 336 and 337 with pivotal or movable components 334 and 335 (e.g., arms extending outward from the device's body from a pivotal coupling or the like) upon release or dropping by the UAVs 310, 311 (e.g., decouple one or more cables/lines 316, 317 or move the UAVs 310, 311 downward toward the ground 302 in a rapid manner). Kinetic energy provided by movement 320, 321 can also be used to activate the components 334, 335 to move 336, 337 in a desired manner (at a desired speed or direction(s)), e.g., one UAV 310 may hover while the other UAV 311 moves relative to the UAV 310 causing the arm 334 to pivot 336 about its pivotal coupling.

In addition to the use of the potential and kinetic energy provided by the UAVs 310, 311, the show effect device 330 may be activated or animated through the use of downwash forces from one or both of the UAVs 310, 311. For example, as shown, the show effect device 330 includes a plurality of movable or actuatable components or members 340 (e.g., texturing elements that may imitate grass, hair, or other movable objects) on the exposed surfaces of the body of the show effect device 330. Downwash 314 from the spinning rotors 312 of the UAV 310 contacts the actuatable components 340 which forces them to move 341 in a dynamic or turbulent manner. The volume of air flow provided by the downwash 314 and the forces it applies may vary in amount and direction quickly over time depending on the vehicle, which can be desirable to create believable, organic motion in a show effect. In this way, the show effect device 330 is uniquely configured to make use of potential, kinetic, and downwash energy provided by the UAVs 310, 311 to achieve desirable show effects.

As can be understood from FIGS. 1-3, the aerial show systems provide downwash propelled or activated components or systems. An animation platform (e.g., a show effects device or show element) may be mechanically coupled to the lift and propulsion systems of the UAV (such as via the UAV body/chassis and mounting frames/structures extending therefrom). Further, the animation platform or its movable components are aerodynamically coupled to the downwash produced or output by the lift and propulsion systems of the UAV. The animation platform or its movable components may include aerodynamic surfaces adapted to convert the downwash energy into animation motive force to actuate movable components of the animation platform. The animation platform may be directly physically attached to the lift and propulsion systems or the UAV body/chassis or it may be suspended from or towed by the UAV. The lift and propulsion systems of the UAV produce turbulence in the airspace, and the animation platform's aerodynamic surfaces convert the turbulence or energy in the moving air into animation forces.

Figure 4:
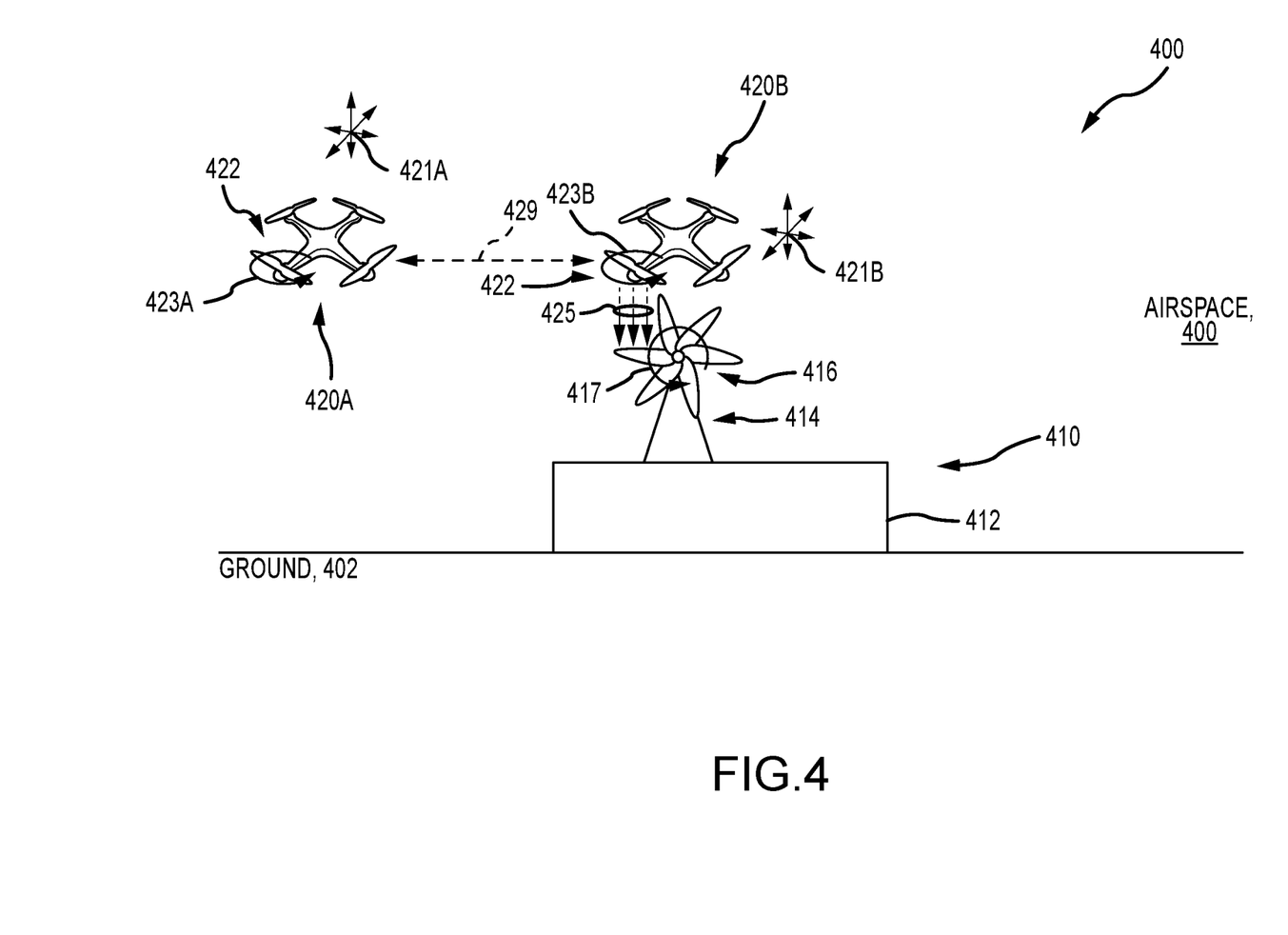
FIG. 4 illustrates an aerial show system (e.g., another implementation of portions of the system of FIG. 1) of the present description using a UAV to animate or activate a ground-based show effect device using its downwash.

In some other cases, the animation platform is located or positioned on the ground, and one or more UAVs of a show system traverses above it to generate downwash to animate or activate its movable or actuatable components. FIG. 4 illustrates an aerial show system (e.g., another implementation of portions of the system of FIG. 1) 400 using a UAV to animate or activate a ground-based show effect device using its downwash. Particularly, the system 400 includes a show effect device 410 with a base or platform positioned or supported on the ground 402, and the device 410 includes a movable or actuatable component 416 pivotally coupled or supported at the top of a tower 414, which is affixed to the base 412. The movable component 416 generally is static until outside forces are applied as the device 410 does not include an actuator or motor for causing the component 416 (e.g., blades of a propeller or windmill or the like) to spin.

The system 400 includes a UAV 420A, 420B to selectively provide downwash forces to cause the component 416 to spin about its center axis. In a first operating state, the UAV 420A uses its lift and propulsion mechanisms (e.g., spinning rotors as shown with arrow 423A or the like) 422 to move 421A the UAV 420A in three dimensions in the airspace 404 over the ground 402. The UAV 420A is not located in a position in the airspace 404 to direct its downwash onto the surfaces of the component 416 so it does not spin (i.e., is not presently actuated). To suit a particular show line and timing for a show effect, the UAV 420B moves 421B along a flight path 429 to hover in a second position in the airspace 404 that is chosen to direct its downwash 425 from the operating 423B lift and propulsion mechanisms 422 of the UAV 420B onto the aerodynamic surfaces of the movable component 416, which converts the downwash energy into movement 417 (here rotation) so that the component 416 is animated or actuated by the downwash 425. The altitude above ground of UAV 420B may be varied to modulate the force of the downwash and, hence, the magnitude of the show effect. When the show effect is no longer desired, the UAV 420A may fly 421A back along the path 429 to its first operating position in the airspace 404 (or another location moving the downwash away from the component 416 or its aerodynamic surfaces). In this manner, a UAV may be effectively used to provide actuation of a ground-based show effect device in a selective manner to allow operation of the show effect device to be synchronized well with other show effect devices in the airspace 404 or on the ground 402.

Figure 5:
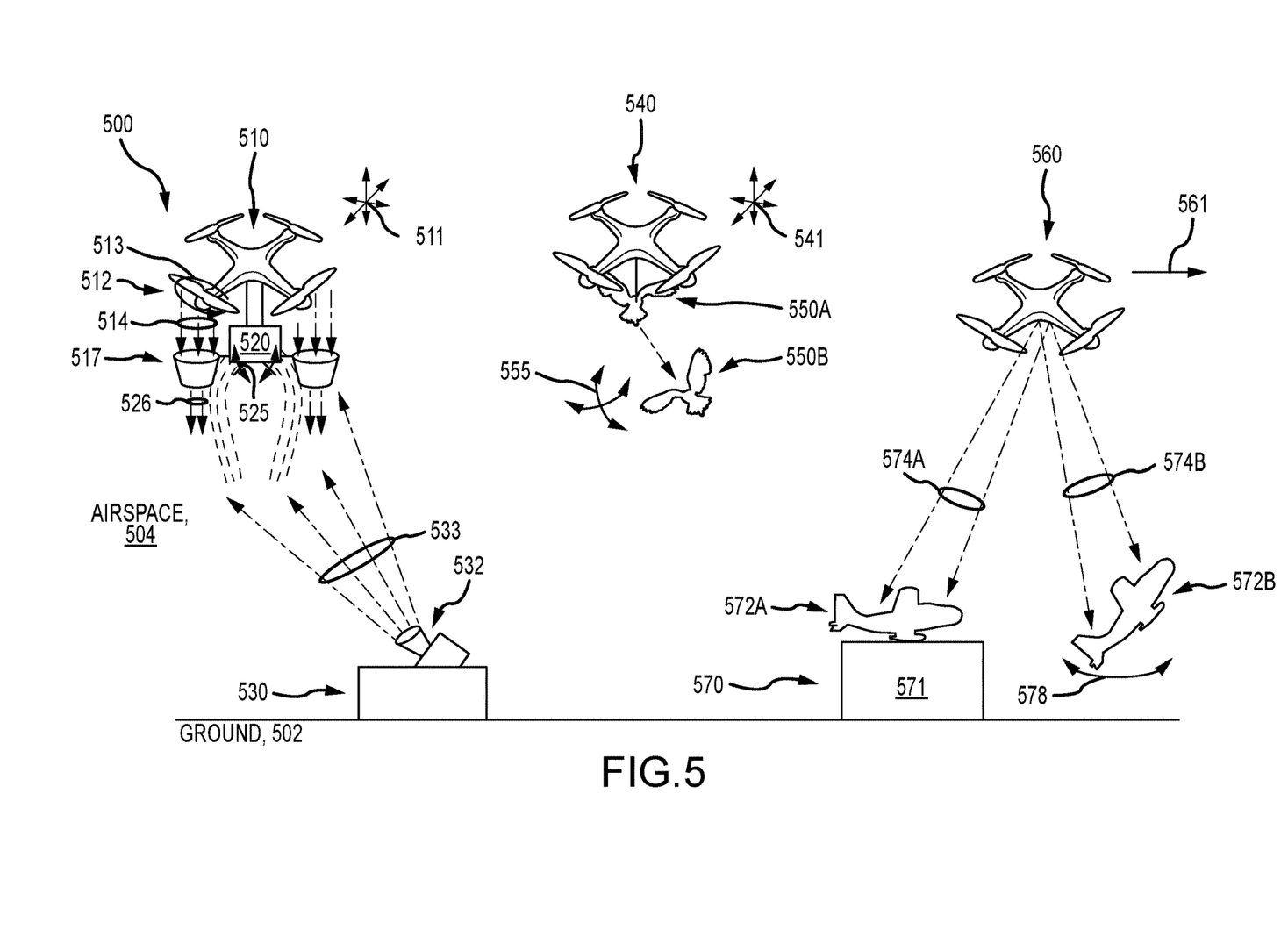
FIG. 5 illustrates an aerial show system (e.g., an implementation of portions of the system of FIG. 1) showing use of UAVs and the energy they output or provide to achieve additional show effects.

FIG. 5 illustrates an aerial show system (e.g., an implementation of portions of the system of FIG. 1) 500 showing use of UAVs and the energy they output or provide to achieve additional show effects that may be used with those of FIGS. 2-4 or independently to achieve a unique show experience. As shown, the system 500 includes a UAV 510 flying 511 in three dimensions through an airspace 504 some distance above the ground 502. To this end, the UAV 510 includes a lift and propulsion mechanism with a number of rotors 512 that are rotating as shown with arrow 513. Each rotor 512, hence, generates downwash 514 that is airflow moving toward the ground 502.

A show effect device 520 is coupled to the body/chassis of the UAV 510 to be moved 511 about the airspace 504 with the UAV 510. The show effect device 520 includes a movable or actuatable component in the form of a plurality of particles or objects 526 that can be selectively launched or released from the body of the device 520 such as by opening the release doors or hatches 524 as shown with arrows 525. The kinetic and potential energy of the UAV 510 provided by the movements 511 are imparted to these released particles 526. Further, the downwash 514 also imparts turbulence and energy into the particles to achieve a desired show effect. This effect can be tuned or altered by providing one or more funnels or similar flow directing/shaping devices 516 below the rotors or outlets of the lift and propulsion mechanism 512 to receive and redirect/concentrate the airflow as shown with arrows 517 prior to it being introduced into the particles 526 and their aerodynamic surfaces. The particles may take the form of artificial snow, confetti, bubbles, yarn, ribbon, objects with aerodynamic surfaces, water droplets, promotional items, and so on to achieve a desired show effect or audience reaction.

In some cases (as shown), a ground-based show effect device 530 is also included in the system 500, and the device 530 includes a projector or other light source 532 for projecting images or light 533 onto the falling particles 526. To this end, the funneling components 516 and/or the outlet portions of the body of the onboard show effect device 520 may be configured to direct the particles 526 and/or shape their flow pattern so as to create a projection surface or screen. The projector/light source 532 can then project its light 533 onto this particle-based screen. In some embodiments, the particles 526 take the form of water droplets, and the downwash 517 and/or outlet elements of the device 520 are adapted to vaporize outlet water to form the droplets 526.

The system 500 further includes a second UAV 540 that is flying 541 in the airspace 504 a distance over the ground 502. The UAV 540 is shown to be supporting a show effect device 550A that may take the form of an animatronic or robotic device. The movement/flight 541 of the UAV 540 imparts kinetic and potential energy to the animatronic/device 550A, and this can be used to complete an aerial maneuver or show effect. This is shown with the animatronic/device 550B operating in a second state upon release or launch from the UAV's body/chassis (e.g., uncoupling a tether, imparting additional forces to direct the animatronic/device 550B in a particular direction at a desired speed, and so on). In the second operating state, the animatronic/device 550B may be equipped with actuatable aerodynamic surfaces to modulate its trajectory characteristics and achieve a desired series of movements 555 as it travels through the airspace 504 toward the ground. These maneuvers are facilitated by the potential and kinetic energy imparted by the UAV 540 prior to the release/launch, and the forces of downwash on any aerodynamic surfaces while the device 550B leaves the zone of influence below the UAV 540.

The system 500 also includes a third UAV 560 flying 561 through the airspace 504, and a ground-based show effect device 570 is provided with a movable or actuatable component 572A, 572B. The component 572A, 572B may be a robotic component, a show prop, or the like, which is coupled or tethered via lines/cables 574A, 574B. In a first operating state of the system 500, the component/object 572A is attached to or supported upon a base/platform 571 of the show effect device 570 and the UAV 560 moves 561, which imparts energy to the tethering line/cable 574A. In a second operating state of the system 500, the component/object 572B is released from or lifted off of the base/platform 571 as this energy in the tethering line/cable 574B is released or used to launch or move 578 the component/object 572B such as with a projectile movement and/or a pendulum movement.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system adapted for providing an aerial show with animated show elements, comprising:
   an unmanned aerial vehicle (UAV) comprising a chassis and lift and propulsion mechanisms moving the chassis to one or more heights above the ground; and
   a show effect device including an actuatable component, wherein the show effect device is coupled to the chassis to move with the UAV through the airspace,
   wherein the actuatable component is actuated by conversion of kinetic or potential energy imparted to the show effect device by the moving of the chassis of the UAV in the airspace,
   wherein the lift and propulsion mechanisms generate downwash during the moving of the chassis of the UAV through the airspace,
   wherein the actuatable component is aerodynamically coupled to the downwash and is fully or further actuated by the downwash,
   wherein the show effect device is supported by the chassis,
   wherein the actuatable component comprises a plurality of particles released from show effect device, and
   wherein the downwash induces movement of the plurality of particles to achieve a show effect.

2. The system of claim 1, wherein the kinetic energy results from the UAV moving in three dimensions in the airspace and wherein the potential energy results from the UAV moving to the one or more heights above the ground.

3. The system of claim 1, wherein the actuatable component is static until contacted by the downwash and includes aerodynamic surfaces that convert the downwash into motive force to actuate moving elements of the show effects device.

4. The system of claim 1, wherein the show effect device further comprises a funneling element receiving and redirecting the downwash to direct a trajectory of the plurality of particles released from the show effect device.

5. The system of claim 1, wherein the plurality of particles are water droplets, wherein the downwash spreads the water droplets to form a projection surface, and wherein the system further includes a projector projecting video or laser light onto the projection surface.

6. The system of claim 1, wherein the show effect device is physically attached to the chassis, is suspended from the chassis, or is towed by the UAV during the moving through the airspace.

7. The system of claim 1, wherein the lift and propulsion mechanisms generate turbulence in air of the airspace and aerodynamic surfaces of the actuatable component convert energy provide by the turbulence in the air into an animation motive force.

8. The system of claim 1, wherein the show effect device includes a portion positioned on the ground and wherein the UAV traverses above the actuatable component during the moving through the airspace to direct downwash from the lift and propulsion mechanisms onto surfaces of the actuatable component to actuate movement of the actuatable component.

9. The system of claim 1, wherein the show effect device is coupled to the chassis, wherein the actuatable component comprises an object operable to perform acrobatic maneuvers after release in the airspace from the show effect device, and wherein at least one of the moving of the UAV and the height of the UAV in the airspace upon the release provides launching conditions for completion of the acrobatic maneuvers.

10. The system of claim 1, wherein the show effect device includes a portion positioned on the ground, and wherein the actuatable component is tethered to the chassis and is adapted to use the kinetic energy to obtain lift, launch, or pendulum movement in the airspace.

11. A system for providing an aerial show with dynamic show elements, comprising:

an aircraft comprising a body and a lift and propulsion mechanism operable to move the body through an airspace; and
a show effect device supported on or below the body and including an actuatable component,
wherein the lift and propulsion mechanism generates downwash when moving of the body through the airspace,
wherein the actuatable component is actuated to move when the downwash contacts one or more surfaces of the actuatable component,
wherein the actuatable component comprises a plurality of particles released from the show effect device, and
wherein the downwash induces movement of the plurality of particles to achieve a show effect.

12. The system of claim 11, wherein the show effect device further comprises a funneling element receiving and redirecting the downwash to direct a trajectory of the plurality of particles released from the show effect device.

13. The system of claim 11, wherein the plurality of particles are water droplets, wherein the downwash spreads the water droplets to form a projection surface, and wherein the system further includes a projector projecting video or light onto the projection surface.

14. The system of claim 11, wherein the actuatable component comprises an object operable to perform acrobatic maneuvers after release in the airspace from the show effect device, and wherein at least one of moving of the UAV through the airspace and the height of the UAV in the airspace upon the release provides launching conditions for completion of the acrobatic maneuvers.

15. A system for providing an aerial show with animated show elements, comprising:
an unmanned aerial vehicle (UAV) comprising a chassis and lift and propulsion mechanisms moving the chassis to one or more heights above the ground; and
a show effect device including an actuatable component,
wherein the flight propulsion mechanisms generate downwash during the moving of the chassis of the UAV through the airspace, and
wherein the actuatable component is aerodynamically coupled to the downwash and is actuated by the downwash.

16. The system of claim 15, wherein the show effect device is positioned on the ground and wherein the UAV traverses above the actuatable component during the moving through the airspace to direct downwash from the lift and propulsion mechanisms onto surfaces of the actuatable component to actuate movement of the actuatable component.

17. The system of claim 15, wherein the show effect device is positioned on the ground, and wherein the actuatable component is tethered to the chassis and is adapted to use kinetic energy of the UAV to obtain lift, launch, or pendulum movement in the airspace.

18. A system adapted for providing an aerial show with animated show elements, comprising:
an unmanned aerial vehicle (UAV) comprising a chassis and lift and propulsion mechanisms moving the chassis to one or more heights above the ground; and
a show effect device including an actuatable component,
wherein the show effect device is coupled to the chassis to move with the UAV through the airspace,
wherein the actuatable component is actuated by conversion of kinetic or potential energy imparted to the show effect device by the moving of the chassis of the UAV in the airspace,
wherein the show effect device includes a portion positioned on the ground, and
wherein the UAV traverses above the actuatable component during the moving through the airspace to direct downwash from the lift and propulsion mechanisms onto surfaces of the actuatable component to actuate movement of the actuatable component.

19. The system of claim 18, wherein the lift and propulsion mechanisms generate turbulence in air of the airspace and aerodynamic surfaces of the actuatable component convert energy provided by the turbulence in the air into an animation motive force.

20. A system adapted for providing an aerial show with animated show elements, comprising:
an unmanned aerial vehicle (UAV) comprising a chassis and lift and propulsion mechanisms moving the chassis to one or more heights above the ground; and
a show effect device including an actuatable component,
wherein the show effect device is coupled to the chassis to move with the UAV through the airspace,
wherein the actuatable component is actuated by conversion of kinetic or potential energy imparted to the show effect device by the moving of the chassis of the UAV in the airspace,
wherein the show effect device is coupled to the chassis,
wherein the actuatable component comprises an object operable to perform acrobatic maneuvers after release in the airspace from the show effect device, and
wherein at least one of the moving of the UAV and the height of the UAV in the airspace upon the release provides launching conditions for completion of the acrobatic maneuvers.

21. The system of claim 20, wherein the lift and propulsion mechanisms generate turbulence in air of the airspace and aerodynamic surfaces of the actuatable component convert energy provided by the turbulence in the air into an animation motive force.

22. A system adapted for providing an aerial show with animated show elements, comprising:
an unmanned aerial vehicle (UAV) comprising a chassis and lift and propulsion mechanisms moving the chassis to one or more heights above the ground; and
a show effect device including an actuatable component,
wherein the show effect device is coupled to the chassis to move with the UAV through the airspace,
wherein the actuatable component is actuated by conversion of kinetic or potential energy imparted to the show effect device by the moving of the chassis of the UAV in the airspace,
wherein the show effect device includes a portion positioned on the ground, and
wherein the actuatable component is tethered to the chassis and is adapted to use the kinetic energy to obtain lift, launch, or pendulum movement in the airspace.

23. The system of claim 22, wherein the lift and propulsion mechanisms generate turbulence in air of the airspace and aerodynamic surfaces of the actuatable component convert energy provide by the turbulence in the air into an animation motive force.

24. A system for providing an aerial show with dynamic show elements, comprising:
an aircraft comprising a body and a lift and propulsion mechanism operable to move the body through an airspace; and
a show effect device supported on or below the body and including an actuatable component, wherein the lift and propulsion mechanism generates downwash when moving of the body through the airspace, wherein the actuatable component is actuated to move when the downwash contacts one or more surfaces of the actuatable component, wherein the actuatable component comprises an object operable to perform acrobatic maneuvers after release in the airspace from the show effect device, and wherein at least one of moving of the UAV through the airspace and the height of the UAV in the airspace upon the release provides launching conditions for completion of the acrobatic maneuvers.

25. The system of claim 24, wherein the actuatable component further comprises a plurality of particles released from the show effect device, wherein the downwash induces movement of the plurality of particles to achieve a show effect, and wherein the show effect device further comprises a funneling element receiving and redirecting the downwash to direct a trajectory of the plurality of particles released from the show effect device.

26. The system of claim 24, wherein the actuatable component comprises a plurality of particles released from the show effect device, wherein the downwash induces movement of the plurality of particles to achieve a show effect, wherein the plurality of particles are water droplets, wherein the downwash spreads the water droplets to form a projection surface, and wherein the system further includes a projector projecting video or light onto the projection surface.

* * * * *